L. C. SCHNEIDER.
DOUBLE PIPE CONDENSER.
APPLICATION FILED SEPT. 22, 1910.
1,016,582.
Patented Feb. 6, 1912.
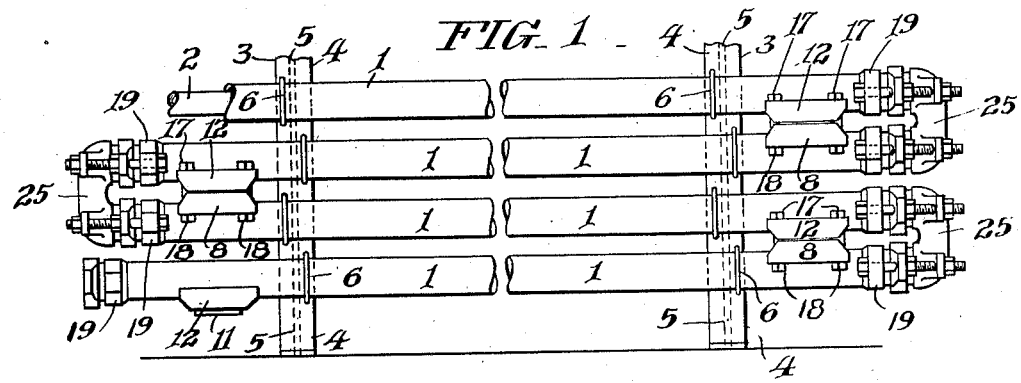
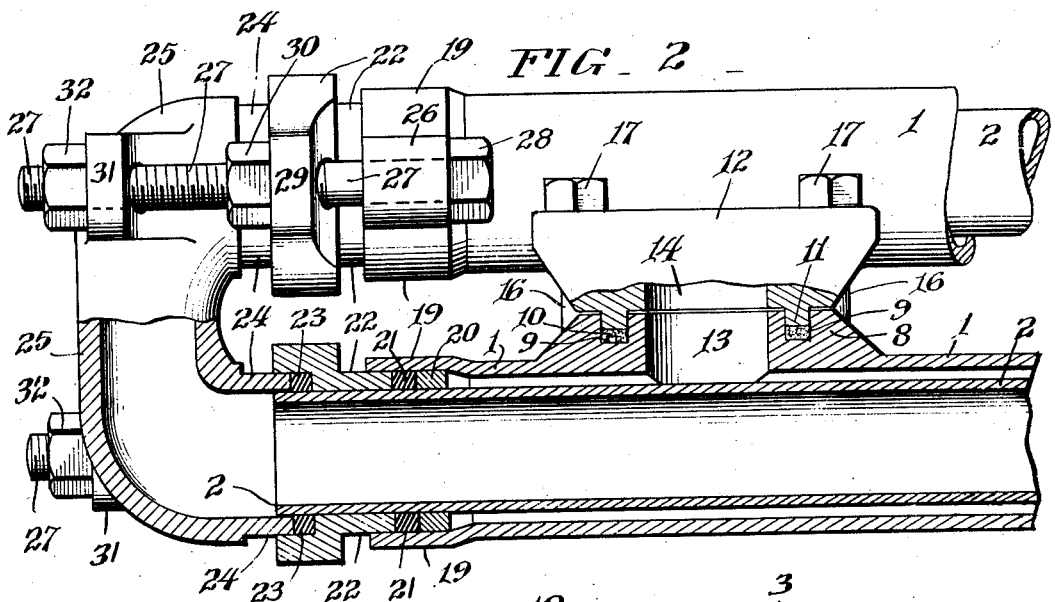
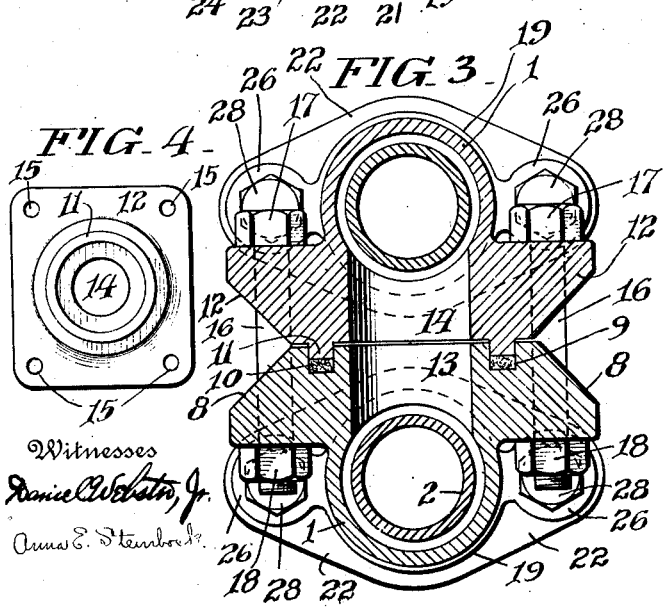
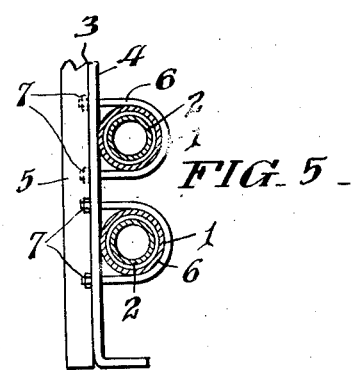
Inventor
Leopold C. Schneider
by Cornelius L. Ehret
his Attorney
Witnesses

UNITED STATES PATENT OFFICE.

LEOPOLD C. SCHNEIDER, OF PHILADELPHIA, PENNSYLVANIA, ASSIGNOR TO THE PHILADELPHIA PIPE BENDING COMPANY, A CORPORATION OF NEW JERSEY.

DOUBLE-PIPE CONDENSER.

1,016,582. Specification of Letters Patent. Patented Feb. 6, 1912.

Application filed September 22, 1910. Serial No. 583,154.

*To all whom it may concern:*

Be it known that I, LEOPOLD C. SCHNEIDER, a citizen of the United States, residing at Philadelphia, county of Philadelphia, and State of Pennsylvania, have invented certain new and useful Improvements in Double-Pipe Condensers, of which the following is a specification.

My invention relates to a double pipe condenser or similar apparatus wherein concentric pipes are employed, one within the other, one conducting a cooling agent, such as water, while the other conducts the gas or liquid to be cooled.

My invention resides more particularly in a double pipe return connection for use in condensers such as above described, for condensing ammonia gas, cooling brine, or for any other purpose.

It is the object of my invention to simplify and improve the construction of double pipe return connections for whatever purpose used, to make the pipes accessible independently of each other, and to this end have provided the means and features hereinafter described and claimed, and constituting my invention.

For an illustration of one of the forms my invention may take, reference is to be had to the accompanying drawings, in which:

Figure 1 is a side elevational view of a stack of pipes fitted with my improved return connections. Fig. 2 is an elevational view, partly in longitudinal section, illustrating the double return connection. Fig. 3 is a transverse sectional view, parts in elevation, of my return connection. Fig. 4 is a plan view of one of the connecting members. Fig. 5 is a fragmentary view, partly in section, showing the concentric pipes secured to a support.

Within each external pipe 1 is an internal pipe 2 with a space between them, so that gas or liquid may be passed through such space while another gas or liquid passes through the internal pipe. These concentric pipes are made into a stack by securing them to the members 3, such as T bars, having the flange 4 and the web 5. As seen in Figs. 1 and 5 the pipes are secured to the members 3 by stirrups 6 embracing the pipes and extending through the flanges 4 and secured by nuts 7. At the ends of the double pipes double return connections are provided, so that the return passages are maintained separate and distinct from each other.

As seen from Fig. 2, a flange coupling member 8 is welded to the external pipe 1 and is provided with a circular groove 9 in which is secured packing material, such as rubber or other suitable material 10; and into the groove 9 fits the circular tongue 11 upon the complementary or associate flange coupling member 12 similarly welded to the neighboring external pipe 1. The flange coupling members 8 and 12 are pierced by passages 13 and 14 respectively, in alinement with each other, and communicate with the interiors of the external pipes 1, as shown in Figs. 2 and 3.

The flange coupling member 12 is shown in Fig. 4 in plan view, looking from the under side of Fig. 3.

Each of the flange coupling members 8 and 12 is provided with the bolt holes 15, such as shown in Fig. 4, these bolt holes coming opposite each other in the two flange coupling members and through them extend the bolts 16 provided with heads 17 and nuts 18, for drawing the flange coupling members snugly together to make a tight joint at 9, 10, 11, allowing free passage of gas or liquid from the space surrounding one internal pipe 2 to the space surrounding the other internal pipe 2.

At the end of each external pipe 1, beyond the flange coupling members 8 or 12, the external pipe 1 is expanded as shown at 19, the internal pipe extending beyond and outside of the external pipe 1, in the particular form illustrated. Embracing the pipe 2 and fitting within the expanded portion 19 of the pipe 1 is a steel or other ring 20, and next to the ring 20 is disposed a gasket 21 of rubber of other suitable material, against which engages the inner end of a gland member 22, of steel or other suitable material. The expanded portion 19 is preferably shrunk upon ring or collar 20 to hold the same securely, and pipe 2 may be easily passed through collar or ring 20. In the outer part of the gland member 22 is disposed a gasket 23 of rubber or other suitable material against which engages the end 24 of the bend member 25 of cast iron or other suitable material, whose other end 24 engages in the gland member 22 of the neighboring pipe. Upon the expanded portion 19 of the external pipe 1 are welded or otherwise secured ears 26 having holes through which extend the bolts 27 having heads 28 engaging against one side of the ears 26. The bolts 27 extend through holes in ears 29 upon the gland members 22, nuts 30 engaging the bolts 27 and drawing the gland members 22 toward and into the expanded portions 19 of the external pipes 1. The bolts 27 continue on outwardly and extend through ears 31 upon the bend members 25, and nuts 32 upon the bolts 27 engage the ears 31 and force the bend members 25 toward the right, as viewed in Fig. 2, snugly against the packing material 23 in the gland members 22. It is apparent, therefore, that these bolts serve both to secure the gland members to the external pipes and to draw the bends, as 25, into proper relation with respect to the gland members 22 and the internal pipes 2.

From the foregoing description, it is apparent that the return bends of the interior pipes may be removed and that the interior pipes themselves may be removed from within the exterior pipes without disturbing the connection between the exterior pipes. It is also possible to easily and promptly disconnect an exterior pipe and its internal pipe from a neighboring pair by the construction shown.

By the construction herein disclosed, the exterior pipe is itself employed as a fitting or connection member, for where it is expanded, at 19, it receives the packing material and the gland to make a tight joint around the interior pipe. The construction shown, involving this mode of use of the external pipe, together with the flange couplings welded to the external pipes, avoids the use of separate screw threaded fittings threaded to the external pipes and in turn secured to each other.

By my construction, the exterior and internal pipes may be made of metal other than cast metal, and particularly the exterior pipe is of metal other than cast metal to permit the welding of the flanges 8 and 12 thereto and to permit of the expansion of the end as at 19. It is furthermore apparent that in my construction both the internal and external pipes are unthreaded, i. e. blank, thus greatly cheapening the manufacture.

What I claim is:

1. In apparatus of the class described, an exterior pipe, and a flange coupling having an opening communicating with the interior of said pipe, said flange coupling welded to said pipe, the end of said pipe being expanded, said expanded end having a greater internal diameter than the internal diameter of said pipe.

2. In apparatus of the class described, an exterior pipe, a coupling welded on said pipe and having an opening communicating with the interior of said pipe through an opening in the side of said pipe, an internal pipe within said external pipe, a gland joint between said external and internal pipes beyond said coupling, a bend forming communication with the interior of said internal pipe, and a second gland joint between said internal pipe and said bend.

3. In apparatus of the class described, an exterior pipe, a flange coupling having an opening communicating with the interior of said pipe, said flange coupling welded to said pipe, the end of said pipe being expanded, said expanded end having a greater internal diameter than the internal diameter of said pipe, and a ring within said expanded end.

4. In apparatus of the class described, an exterior pipe, a coupling welded on said pipe and having an opening communicating with the interior of said pipe through an opening in the side of said pipe, an internal pipe within said external pipe, a bend communicating with the interior of said internal pipe, and a unitary double gland beyond said coupling forming joints between said external and internal pipes and said internal pipe and said bend.

5. In apparatus of the class described, an exterior pipe, a flange coupling having an opening communicating with the interior of said pipe, said flange coupling welded to said pipe, the end of said pipe being expanded, said expanded end having a greater internal diameter than the internal diameter of said pipe, and a ring within said expanded end, said expanded end shrunken upon said ring.

6. The combination with an external pipe, of a coupling welded on the side thereof, having a passage communicating with the interior of said pipe through an opening in the side of said pipe, an internal pipe disposed within said external pipe, a bend communicating with the interior of said internal pipe, an annular gap formed between said external and internal pipes beyond said coupling, means forming a joint between said external and internal pipes in said annular gap and forming a second and distinct joint between said internal pipe and said bend beyond said first mentioned joint.

7. In combination, neighboring pairs of external and internal pipes, flange couplings welded to the sides of the external pipes and having passages communicating with the interiors of said external pipes, means for holding said flange couplings together, a gland member surrounding each internal pipe and directly engaging the external pipe and with a bend for forming a closed joint between the external pipe and the internal pipe and between the interiors of the interior pipe and of said bend, and a bolt coöperating with said pipe bend said gland member and said external pipe for holding the same in operative relation.

8. In combination, an external pipe, an expanded end thereon, a ring within said expanded end, an internal pipe extending through said ring, and a gland member engaging said external pipe for making a closed joint between said external and internal pipes.

9. In combination, an external pipe, an expanded end thereon, a ring within said expanded end, an internal pipe extending through said ring, a gland member engaging said external pipe for making a closed joint between said external and internal pipes, and a flange coupling welded to the side of said external pipe and having a passage communicating with the interior of said external pipe.

10. A double pipe condenser comprising a series of pairs of external and internal pipes, a flange coupling welded to the side of each external pipe, means for connecting said flange couplings to each other, a passage through said flange couplings communicating with the interiors of the external pipes, a gland surrounding the interior pipe and engaging in the exterior pipe, and means engaging in neighboring glands for connecting the interiors of neighboring internal pipes together.

11. A double pipe condenser comprising a series of pairs of external and internal pipes, a flange coupling welded to the side of each external pipe, means for connecting said flange couplings to each other, a passage through said flange couplings communicating with the interiors of the external pipes, each external pipe having an expanded end, a gland engaging in said expanded end, the internal pipe extending within said gland, and a bend engaging in said gland adapted to connect the interior of the internal pipe to the interior of a neighboring internal pipe.

12. A double pipe condenser comprising a series of pairs of external and internal pipes, a flange coupling welded to the side of each external pipe, means for connecting said flange couplings to each other, a passage through said flange couplings communicating with the interiors of the external pipes, bends connecting the interiors of the interior pipes, and glands beyond said flange couplings engaging said bends and said external and internal pipes.

13. A double pipe condenser comprising a series of pairs of external and internal pipes, an expanded end on each external pipe, a bend connecting the interiors of neighboring interior pipes, and a gland member engaging in said expanded end forming a joint between said bend and the interior pipe and forming a closed joint between an external pipe and its internal pipe.

14. A double pipe condenser comprising a series of pairs of external and internal pipes, an expanded end on each external pipe, a bend connecting the interiors of neighboring interior pipes, a gland member engaging in said expanded end forming a joint between said bend and the interior pipe and forming a closed joint between an external pipe and its internal pipe, a flange coupling welded to the side of each external pipe, means for connecting the flange couplings on neighboring pairs, and passages through said flange couplings to the interiors of the external pipes.

15. A double pipe condenser comprising a series of pairs of blank external and internal pipes, couplings welded on said external pipes, passages through said couplings for connecting the interiors of said external pipes, and glands surrounding said internal pipes forming closed joints between the external and internal pipes beyond said couplings.

16. The combination with a blank external pipe, of a coupling welded on the side thereof and having a passage communicating with the interior thereof, a second pipe disposed within said first mentioned pipe, and a gland surrounding said second pipe beyond said coupling engaging said external and internal pipes to form a closed joint between the same.

17. The combination with a blank external pipe, of a coupling welded on the side thereof and having a passage communicating with the interior thereof, said external pipe having an expanded end beyond said coupling, a second blank pipe disposed within said external pipe, and a gland engaging in said expanded end to form a closed joint between said external and internal pipes.

18. The combination with a blank external pipe, of a coupling welded on the side thereof and having a passage communicating with the interior thereof, said external pipe having an expanded end beyond said coupling, a second blank pipe disposed within said external pipe, a gland engaging in said expanded end to form a closed joint between said external and internal pipes, a member communicating with the interior of said internal pipe, and a joint between said member and said gland.

19. In combination, an external pipe, a coupling welded thereon and having a passage communicating with the interior of said external pipe through an opening in the side of said external pipe, an ear on said external pipe beyond said coupling, an internal pipe disposed within said external pipe, a pipe bend communicating with the interior of said internal pipe, a double gland member forming joints between said external and internal pipes and between said internal pipe and said pipe bend, and a bolt for drawing said pipe bend, said double gland and said ear on said external pipe together.

20. The combination with an external pipe, of a coupling welded thereon and having a passage communicating with the interior of said pipe, an internal pipe disposed within said external pipe, said internal and external pipes extending beyond said coupling and having an annular space between them, a pipe bend affording communication with the interior of said internal pipe, means forming a joint between said external and internal pipes in said annular space beyond said coupling and a second joint between said internal pipe and said bend beyond said first mentioned joint.

In testimony whereof I have hereunto affixed my signature in the presence of the two subscribing witnesses.

LEOPOLD C. SCHNEIDER.

Witnesses:
ELEANOR T. MCCALL,
ANNA E. STEINBOCK.